(12) United States Patent
Goodman

(10) Patent No.: US 6,870,829 B1
(45) Date of Patent: Mar. 22, 2005

(54) MESSAGE SIGNALLING IN A SYNCHRONOUS TRANSMISSION APPARATUS

(75) Inventor: David M. Goodman, St. Albans (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/537,361

(22) Filed: Mar. 29, 2000

(51) Int. Cl.$^7$ .............................................. H04L 12/66
(52) U.S. Cl. ...................... 370/352; 370/463; 370/465; 370/514; 370/535; 370/541
(58) Field of Search .................. 370/352, 353, 370/389, 463, 465, 474, 514, 535, 537, 540, 216, 241, 522, 536, 538, 541, 542, 543, 544, 351, 236, 395.51, 509, 516

(56) References Cited

U.S. PATENT DOCUMENTS

| | | | | |
|---|---|---|---|---|
| 5,621,720 A | * | 4/1997 | Bronte et al. ............... | 370/241 |
| 5,717,693 A | * | 2/1998 | Baydar et al. ............... | 370/514 |
| 5,790,557 A | * | 8/1998 | Lee et al. .................... | 370/535 |
| 5,822,299 A | * | 10/1998 | Goodman .................... | 370/228 |
| 6,094,737 A | * | 7/2000 | Fukasawa .................... | 714/738 |
| 6,496,518 B1 | * | 12/2002 | Taniguchi .................... | 370/465 |

* cited by examiner

*Primary Examiner*—Dang Ton
*Assistant Examiner*—Inder Pal Mehra
(74) *Attorney, Agent, or Firm*—Barnes & Thornburg LLP (57) ABSTRACT

The invention relates to message signalling in a synchronous transmission apparatus using redundant pointer bits as a signalling channel within the apparatus. The preferred embodiment uses one or more of the new data flag (NDF) pointer bits as a signalling channel. The invention has particular, but not exclusive, application in the field of performance monitoring in a path protected telecommunications network, where the pointer bit signalling channel is used to communicate between data ports which transmission path is selected.

13 Claims, 3 Drawing Sheets

MESSAGE SIGNALLING IN A SYNCHRONOUS TRANSMISSION APPARATUS

FIELD OF THE INVENTION

The present invention relates to message signalling in a synchronous transmission apparatus. The invention has particular, but not exclusive, application in the field of performance monitoring in a protected sub network connection within a synchronous transmission or telecommunications network.

BACKGROUND OF THE INVENTION

In a synchronous telecommunications network or system, such as a Synchronous Digital Hierarchy (SDH) or SONET transmission network, traffic data is transported across the network via a transmission path. A path may comprise a number of sections, each section comprising a transport service between two adjacent nodes of the network. Each network node typically comprises a synchronous transmission apparatus, such as a multiplexer, a regenerator or a cross-connect, for receiving the traffic and, where applicable, processing the traffic and transmitting it on to another network node or to a local terminal.

It is common to provide path protection such that the traffic arrives at a target node via two independent paths namely, a main path and a reserve path. If, for any reason, the main path should be compromised or should fail, then the reserve path is selected. Thus, a synchronous transmission apparatus is provided with a respective data port for each incoming path and a single data port for output of the selected path. The transmission quality of each path is evaluated at the respective ingress data port and the results are communicated to the output data port. A quality comparison is made at the output data port and the path of higher quality is selected.

It is increasingly important for telecommunications network operators to be able to provide information to customers concerning the performance of their networks. Typically, performance monitoring involves measuring the quality of the traffic at selected nodes of a given path by performing, for example, parity checks. Where sub-network connection protection is employed, only the performance information for the selected path may be required. This is problematic since the performance of the traffic on the main and reserve paths is normally monitored at the respective ingress data ports while the selection between main and reserve paths is performed at the output data port. It is necessary therefore to communicate, or signal, to each ingress data port whether or not its respective path is selected at the output data port. The ingress data port of the selected path duly compiles the required performance monitoring information and reports the compiled information on to, for example, a central monitoring unit for further processing, or logs the information, as required. The ingress data port of the non-selected path may be arranged to refrain from reporting or logging the information, as required.

It will be appreciated from the foregoing that there is a need for message signalling within a network node and particularly between data ports of a synchronous transmission apparatus.

Normally, each network node includes a microprocessor-based node controller which controls the configuration of the node, including the data ports. It is possible to arrange for the node controller to communicate to the ingress data ports, using a suitable software routine, which path is selected at the output data port. However, such a solution is considered to be too slow, and important monitoring information may be lost by the time the appropriate ingress data port is notified of its path's selection. Alternatively, additional hardware may be provided at the output data port to re-measure or re-calculate the performance data. However, this option involves duplication of circuitry and is undesirable for reasons of cost and size.

SUMMARY OF THE INVENTION

According to a first aspect of the invention there is provided a synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the apparatus comprising:

first and second data ports each arranged to receive a first data signal carried on a respective first and second transmission path;

a path selection module, co-operable with each of said first and second data ports and arranged to select one or other of said first and second transmission paths;

a third data port, co-operable with the path selection module to output data received on the selected one of said first and second transmission paths, the third data port being arranged to receive a second data signal on a respective transmission path and to communicate said second data signal to each of said first and second data ports for output thereby; and a message encoding module, arranged to determine which of said first and second transmission paths is selected, and being co-operable with said second data signal transmission path to adjust at least one of the pointer bits associated therewith to indicate said path selection, each of said first and second data ports being co-operable with the second data signal transmission path to determine the setting of said at least one pointer bit and thereby to determine which of the first and second data paths is selected.

The apparatus of the invention makes use of the fact that some of the pointer bits associated with a given transmission path are redundant within a network node once the data signal carried by that path has been adapted to the local timing at the node. The or each redundant pointer bit is thus available for use as a message signalling channel within the node. The apparatus according to the first aspect of the invention uses one or more of the redundant pointer bits to signal, between data ports, which data path is selected. Using redundant pointer bits as a signalling channel enables a message to be communicated relatively quickly between data ports so that, for example, important performance information is not lost. The invention may be readily and inexpensively implemented since, in a preferred embodiment of the invention, the equipment normally present in a typical network node can be configured to implement the invention.

Normally, the pointer bits include new data flag (NDF) bits and, preferably, the message encoder module is arranged to adjust one or more of the new data flag (NDF) bits.

Preferably, the message encoder module is arranged to adjust at least one pointer bit of new pointer bits which are generated when the second data signal is being adapted to the local timing of the apparatus. Alternatively, the adjustment of said at least one pointer bit is effected during the generation of said new pointer bits.

A second aspect of the invention provides a data port for a synchronous transmission apparatus for use in said synchronous transmission network, the data port being arranged to receive a first data signal from a selected one of a first and a second transmission path, and being further arranged to receive a second data signal on a respective transmission path, the data port including a message encoding module, arranged to determine which of said first and second transmission paths is selected, and being co-operable with said second data signal transmission path to adjust at least one of the pointer bits associated therewith to indicate said path selection.

A third aspect of the invention provides a message signalling method for use in said synchronous transmission apparatus, the method comprising determining which of said first and second transmission paths is selected; adjusting, at said third data port, at least one of the pointer bits associated with said second data signal path to indicate said path selection; determining, at each of said first and second data ports, the setting of said at least one pointer bit thereby to determine which of the first and second data paths is selected.

Message signalling within a network node is not limited to the communication of path selection. Accordingly, a fourth aspect of the invention provides a synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the apparatus including two data ports, one of said data ports being arranged to receive a first data signal on a respective data path, the other data port being arranged to receive a second data signal on a respective data path, said one data port being arranged to communicate said first data signal to said other data port, said other data port being arranged to communicate said second data signal to said one data port, wherein in order to communicate a message relating to said first data signal from said other data port to said one data port, said other data port is arranged to embed said message in one or more pointer bits associated with the path of said second data signal, said one data port being arranged to determine said message by examining said one or more pointer bits.

A fifth aspect of the invention provides a message signalling method for use in the apparatus of the fourth aspect of the invention, the method comprising embedding, at said other data port, a message relating to said first data signal in one or more pointer bits associated with the path of said second data signal; examining, at said one data port, said one or more pointer bits to determine said message.

The new data flag (NDF) pointer bits are suitable for general use as one or more signalling channels within a network node. Accordingly, a sixth aspect of the invention provides a synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the pointer bits including new data flag (NDF) bits, the apparatus comprising two or more data ports and being arranged to communicate data signals between data ports on respective transmission paths, wherein in order to signal a message between data ports, the apparatus is arranged to embed said message in one or more of said new data flag (NDF) bits associated with the transmission path of a data signal being communicated between said data ports.

A seventh aspect of the invention provides a message signalling method for use in the apparatus of the sixth aspect of the invention, the method comprising embedding a message in one or more of said new data flag (NDF) bits associated with the transmission path of a data signal being communicated between said data ports.

Other aspects of the present invention will become apparent to those ordinarily skilled in the art upon review of the following description of specific embodiments of the invention and with reference to the accompanying drawings.

BRIEF DESCRIPTION OF THE DRAWINGS

Embodiments of the invention are now described by way of example and with reference to the accompanying drawings in which.

DETAILED DESCRIPTION OF THE DRAWINGS

Figure 1:
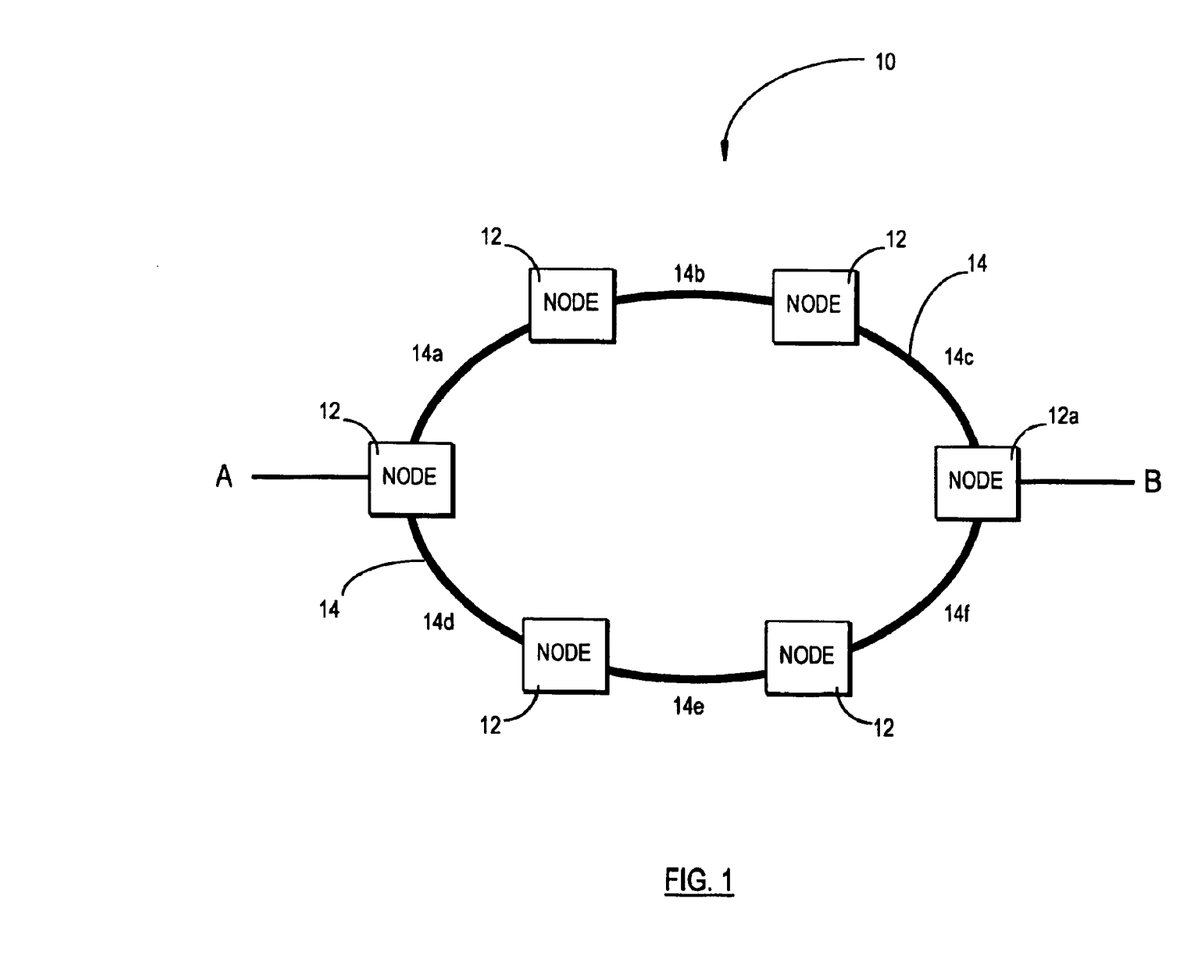
FIG. 1 is a schematic view of a synchronous transmission network.

Referring now to FIG. 1 of the drawings, there is shown, generally indicated at 10, a schematic representation of a synchronous transmission network, or synchronous telecommunications network. The network 10 comprises a plurality of network elements or nodes 12 interconnected by sections 14. Each node 12 comprises a synchronous transmission apparatus, or network equipment, in the form of, for example, a multiplexer, a cross-connect, a regenerator, or other signal processing or switching apparatus.

A synchronous transmission system or network is arranged to transport data signals, or traffic, which are arranged in accordance with a synchronous frame structure. There are a number of standard frame structures defined by, for example, ITU-T and Bellcore, which are commonly used in synchronous transmission systems. In SDH and SONET transmission systems, data signals are packaged, or mapped, into frames known as synchronous transport modules (STMs). An STM frame includes a payload area into which the data signals are mapped in container units. Each container, commonly referred to as a virtual container, contains one or more data signal and some control information known as path overhead (POH). Smaller virtual containers may be loaded, or nested, within larger virtual containers. The virtual containers are normally arranged in tributary units (TUs) or administrative units (AUs).

TUs and AUs are normally arranged in groups known as tributary unit groups (TUGs) and administrative unit groups (AUGs) respectively. TUGs and AUGs are mapped into the payload area of an STM frame. When the STM payload area is full, further control information, known as section overhead, is added to the frame. The purpose of the section overhead is to provide communication channels for functions including operations, administration and maintenance (OA&M) facilities, user channels, protection switching, section performance and frame alignment, between adjacent network nodes 12.

In a synchronous transmission network, the synchronous transmission apparatus incorporated therein are synchronised to an overall network clock. However, the timing of the data signals that are mapped into the virtual containers may vary slightly with respect to the network clock. Further, the delay associated with a transmission link may vary slightly with time. Hence, the location of virtual containers within an STM frame may not be fixed. Such variations are accommodated by associating a pointer with each virtual container. A pointer, which is normally included in a TU, AU and normally comprises a plurality of data bits, indicates the position of the beginning of a respective virtual container with respect to its STM frame, and more specifically, with respect to the TU or AU as appropriate. A pointer can be incremented or decremented, as appropriate, to accommodate for movements of the position of its virtual container within an STM frame.

Figure 2:
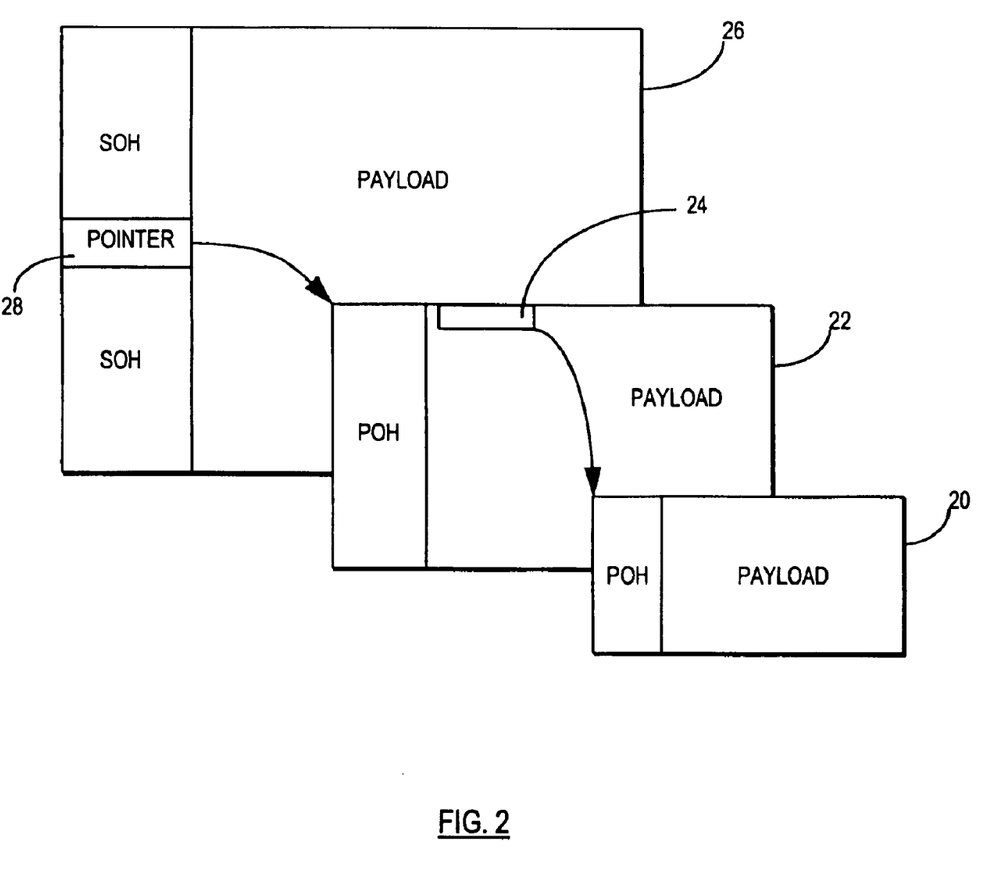
FIG. 2 is a schematic view of a frame structure for use in the network of FIG. 1.

FIG. 2 illustrates an example of an STM frame structure. Data signals are first mapped into the payload area of a smaller virtual container 20, for example a VC-12, which also includes path overhead POH. The smaller virtual container 20 is then mapped into the payload area of a larger virtual container 22, for example a VC-4, together with a pointer 24 which indicates the position of the smaller virtual container 20 within the larger virtual container 22. The larger container 22 may be loaded with a plurality of smaller containers 20, each associated with a respective pointer 24. The pointer for a VC-12 container is known as a TU-12 pointer, the combination of a VC-12 with its respective pointer comprises a tributary unit known as a TU-12, and a group of TU-12s is known as a TUG-2. The larger container 22 further includes path overhead information POH. For convenience and clarity, the pointer 24 is shown as a single block within the virtual container 22, although in reality, the bits of the or each pointer 24 within, say, a VC-4 are typically distributed throughout the payload area in accordance with the frame structure.

The larger virtual container 22 is similarly mapped into the payload area of an STM frame 26 together with an associated pointer 28 to indicate its position within the STM frame 26. The STM payload area may be loaded with a plurality of virtual containers 22, each associated with a respective pointer 28. The pointer for a VC-4 container is known as an AU-4 pointer, the combination of a VC-4 and its respective pointer comprises an administrative unit known as an AU-4, and a group of AU-4s is known as an AUG. The STM frame 26 further includes section overhead information SOH. Normally, the section overhead SOH includes a framing sequence of one or more framing bits (not shown) to enable detection of the frame 26.

A data signal, for example an optical telecommunications signal, is carried across a synchronous transmission network on a transmission path which may span a plurality of network nodes 12 and sections 14. An STM frame 26 supports one or more transmission paths depending on the capacity of the frame and on the the data signal. Each path has associated path overhead POH which enables the network equipment to monitor the transmission of the data signal across the whole path and to perform, for example, quality and error checks.

It is common to transport a data signal from an emanation point, or node, to a target point, or node, via more than one independent path to provide path protection. Normally, two independent paths, namely a main path and a reserve or back-up path, are provided. The synchronous transmission apparatus or equipment at the target node receives the data signal on both the main and reserve paths and, using the path overhead (POH) data, is able to compare the quality of each path. The equipment then selects the path of higher quality for local termination or for forwarding on to other equipment on the network 10.

Referring again to FIG. 1, a data signal (not shown) may, for example, be transported from an emanation point A, which is normally a network node, to a target point B via a main path comprising path sections 14a, 14b and 14c, and via a reserve path comprising path sections 14d, 14e and 14f. The network equipment (not shown in FIG. 1) at node 12a receives the data signal via both the main and the reserve paths and selects the best path for output to target point B, which may be a further network node or a local terminal (not shown).

A data signal received by a synchronous transmission apparatus at a network node 12 must be adapted to the timing of the apparatus, or node 12. This adaptation of the data signal is commonly referred to as pointer processing and includes determining the position of each STM frame 26 and its payload with respect to local apparatus timing. Conventional pointer processing methods are defined by ITU-T/Bellcore standards such as ITU-T G7.83.

This adaptation of the incoming data signal includes the regeneration of one or more pointers i.e. the generation of new pointer bits, to identify the position of a respective virtual container 20, 22 with respect to the local apparatus, or equipment, timing. In some cases, the apparatus is required to process only the higher order virtual containers 22 of an STM frame 26 (referred to hereinafter as 'by-pass' mode) and so only the higher order pointers 28 need be regenerated. This is commonly known as higher order, or section, adaptation. In other cases, the lower order virtual containers 20 are also processed (referred to hereinafter as non by-pass mode) in which case the lower order pointers 24 are also regenerated.

Significantly, once pointer processing is complete, some of the data bits of a regenerated pointer 24, 28 are redundant while the data signal on the relevant path remains within the synchronous transmission apparatus. The method and apparatus of the invention use one or more of said redundant pointer bits as a signalling channel within the network node, and in particular between data ports of the apparatus.

For example, as defined in ITU-T specification G.707, a conventional AU or TU pointer 24, 28 includes four new data flag (NDF) bits and two bits, commonly referred to as 'ss' bits which indicate the size of an AU or TU with which the pointer 24, 28 is associated. After the adaptation of the data signal, the NDF bits and 'ss' bits are not required within a network node and so the apparatus of the invention can use one or more of these bits to provide one or more signalling channels within the network node. However, in order that the data signal may be transmitted on from the node, for example to another node in a network, the or each pointer bit used as a signalling channel should be reset, or regenerated, to its original value.

Figure 3:
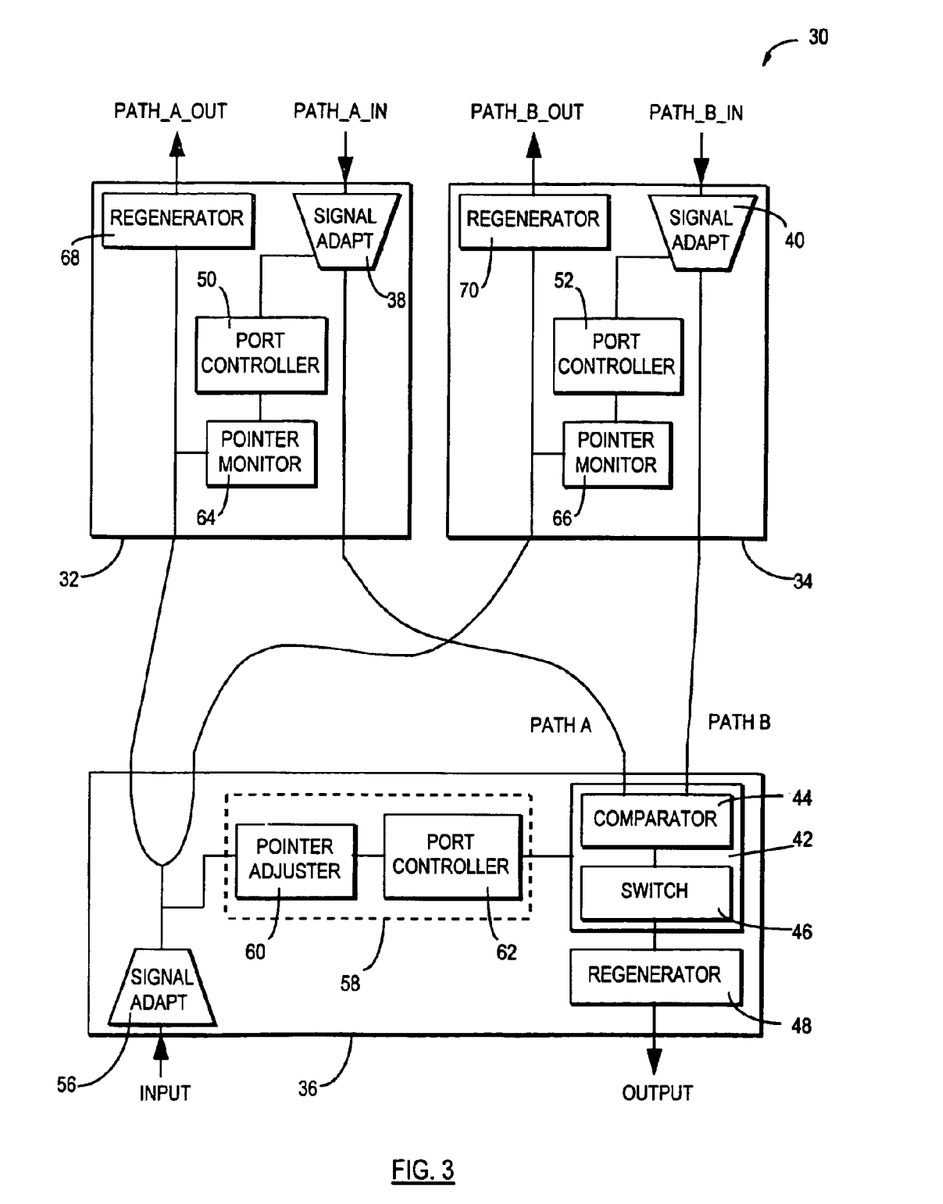
FIG. 3 is a schematic view of a synchronous transmission apparatus according to a first aspect of the invention.

FIG. 3, shows a schematic view of a synchronous transmission apparatus of the invention, generally indicated at 30, for inclusion in a network node 12. The apparatus 30 may take the form of, for example, a multiplexer, a cross-connect, or a regenerator. For clarity, only those components of the apparatus 30 which are essential to the understanding of the invention are shown.

The apparatus 30 comprises first, second and third data ports 32, 34, 36 also known as ingress/egress line cards or Virtual Tributary (VT)/Tributary Unit (TU) synchronisers.

Each data port 32, 34, 36 is bi-directional, or uni-directional, in that it is arranged both to receive and to transmit network traffic.

The first and second data ports 32, 34 are each arranged to receive a first data signal (not shown) carried on a respective first and second transmission path PATH_A_IN, PATH_B_IN. The first and second data ports 32, 34 are further arranged to transmit, or output, network traffic on respective transmission paths PATH_A_OUT, PATH_B_OUT.

The third data port 36 is arranged to transmit, or output, network traffic to a further node (not shown) in the network, or to output a processed data signal to a local termination point (not shown). The output of the third data port 36 is indicated as OUTPUT in FIG. 3. The third data port 36 is further arranged to receive a second data signal in the form of network traffic, or other data signal from, for example, a local emanation point (not shown), and to communicate or transmit the second data signal to each of the first and second data ports 32, 34 for output on respective transmission paths PATH_A_OUT, PATH_B_OUT. The input to the third data port 36 is indicated as INPUT in FIG. 3.

Each of said first and second data ports 32, 34 conveniently includes a respective signal adaptation module 38, 40 arranged to receive the first data signal on respective transmission paths PATH_A_IN, PATH_B_IN. The signal adaptation modules 38, 40 are arranged to perform conventional data signal synchronisation and pointer processing operations as outlined above. The third data port 36 conveniently includes a similar signal adaptation module 56.

During the adaptation process, it is normal to perform quality checks for each transmission path. If, for example, there is a total failure of a path, then path is declared AIS and the regenerated pointer in the path overhead POH associated with that path is set accordingly—normally, all of the pointer bits are set to 1 to indicate AIS. Further quality checks are performed in conventional manner by examining the relevant path overhead POH. For example, the path overhead POH normally includes a Bit Interleaved Parity (BIP) element (not shown) which enables bit error monitoring over the path using a parity check.

In the apparatus 30, quality checks on paths A and B are conveniently performed, in conventional manner, by the respective signal adaptation module 38, 40.

Advantageously, the results of the quality checks for a given path may be recorded by setting one or more of said redundant pointer bits associated with that path in accordance with the measured quality. For example, the setting of the 'ss' bits in a regenerated pointer may be used to indicate any one of four levels of quality. Should either path A or path B be declared AIS, however, then each of the regenerated pointer bits is set to 1 to indicate path failure.

The adapted first data signal is transmitted to the third data port 36 on each path A, B. The third data port conveniently includes a path selection module 42 which receives each path A, B from the respective first and second data ports 32, 34 and selects one or other of the paths A, B for processing or output by the third data port 36. Typically, the selection of one path over another is performed on the basis of path quality. In its simplest form the path selection module 42 includes a comparator module 44 which determines which of the paths A, B exhibits higher quality, and a switching module 46, co-operable with the comparator 44, to select the higher quality path. In the case where quality information is contained in the regenerated 'ss' bits of the respective pointers of paths A, B, the comparator 44 compares the respective 'ss' bits of paths A, B to determine which path exhibits higher quality. The first data signal as carried on the selected path is then output by the third data port 36, processed or unprocessed, depending on the requirements of the application. The third data port 36 further includes a regenerator module 48 for regenerating the 'ss' bits at their original settings, i.e. before they were used to carry quality information. The original settings of the 'ss' bits are known implicitly by the apparatus 30 and depend on the type of data signal which the apparatus 30 is configured to receive.

Path selection, or path switching, causes problems where it is desired to monitor the performance of a transmission path. A transmission path may span several network nodes and at one or more of those nodes, path switching may have occurred. In order to compile performance information, for example parity checks, for the overall path, it is necessary to know which of the main and reserve paths were selected. This is problematic since the parity checking, or other relevant performance measuring, is performed at the respective data ports which receive the main and reserve paths (in FIG. 3, the first and second data ports 32, 34, generally referred to as ingress ports) while the decision on which path is selected is taken subsequently at a point in the apparatus 30 which is 'downstream' of where the performance measuring occurs (in FIG. 3, at the path selection module 42 in the third data port 36, or egress port).

In FIG. 3, the performance of each path A, B is monitored by the respective signal adapters 38, 40. The signal adapters 38, 40 are arranged to communicate the respective calculated performance information to, for example, a respective port controller 50, 52 which may log the information for collection at a later time, or may transmit the information on to, for example, a node controller (not shown) for further evaluation or transmittal. If path A is selected by the path selection module 42, then the performance information for path B is not normally required, and vice versa. It is important to ensure that only the relevant performance information is taken into account when evaluating the performance of the overall path. To this end it is essential to communicate to each of the first and second data ports 32, 34 which of the paths A, B is selected. Preferably, the data port 32, 34 which received the non-selected path, desists from, or ceases to, record performance information, or at least refrains from transmitting the performance information on for evaluation elsewhere. It is important to communicate the path selection to the data ports 32, 34 with relatively high speed to minimize the quantity of performance information which may be lost through delay.

In accordance with first, second and third aspects of the present invention, the communication of path selection to the first and second data ports 32, 34 is achieved by using one or more of the redundant bits of a pointer as a signalling channel. However, since the decision on path selection is made downstream of the first and second data ports 32, 34, namely at the path selection module 42, it is not possible to use the redundant pointer bits of either path A or path B as a signalling channel in this case. The invention therefore provides for the use as a signalling channel of one or more redundant pointer bits of the path carrying the second data signal received by the third data port 36.

For this purpose, the apparatus 30 includes a message encoding module, or message encoder 58, in co-operation with a pointer adjuster module 60 which, in FIG. 3, are conveniently shown incorporated in the third data port 36. The message encoder 58 is co-operable with the path selection module 42 to determine which of the paths A, B is selected. The message encoder 58 is further co-operable with the second data signal path in order to adjust one or more pointer bits associated with that path to indicate the path selection. Advantageously, this is achieved using the pointer adjuster 60 which may conveniently take the general form of conventional hardware (not shown) for adjusting pointer bits (as used, for example, in setting pointer bits to indicate AIS).

In its simplest form, the message encoder 58 is arranged to adjust only one pointer bit and, to this end, the encoder 58 may simply be implemented by arranging the pointer adjuster 60 to be directly, or indirectly, responsive to the output of the comparator 44 by, for example, hard-wiring. If it is desired to adjust more than one pointer bit, then the output of the comparator 44 may be communicated to the pointer adjuster 60 via a conventional hardware encoder (not shown), for example a 1-to-2 encoder.

Preferably, to provide more flexibility, at least a part of the message encoder 58 is implemented using a port controller 62, included in the third data port 36, and one or more data registers (not shown) provided internally by, or externally of, the port controller 62. Port controllers are commonly found in data ports and typically take the form of a microprocessor, or microcontroller. For example, two data registers (not shown) may be provided, a first register for recording whether path A or path B is selected, and a second register for storing the value, or code, to be embedded in the path of the second data signal in each respective case. The first register may be set either directly by the path selection module 42 or by the port controller 62 in response to the comparator 44 output. The port controller 62 reads the first register to determine the path selection and then reads the second register to obtain a corresponding value for the or each pointer bit to be adjusted. The or each obtained value is then communicated to the pointer adjuster 60.

Preferably, the apparatus 30 is configurable to operate in by-pass mode or non by-pass mode. In by-pass mode, only the higher order virtual containers (AUs), or higher order paths, are to be processed and so only the higher order pointers (AU pointers) associated with the second data signal are adjusted. In non by-pass mode, the lower order virtual containers (TUs), or lower order paths are to be processed and so only the lower order pointers (TU pointers) associated with the second data signal are adjusted.

In general, it is possible to use any pointer bit(s) which are redundant within a network node as a signalling channel. A skilled person will appreciate that the redundancy or otherwise of particular pointer bits will depend on the significance of each bit as determined by the particular framing structure. In the present case, It is preferred to use one or more of the NDF bits of a pointer as the signalling channel. Equally, however, it is possible to use one or more of the 'ss' bits, provided these are not already being used to carry quality information as described above.

Of the four NDF bits, two may normally be considered to be redundant since the condition of said redundant two bits may be determined from the condition of the remaining two unmodified bits, as is now explained with reference to

TABLE 1

| Unmodified NDF bits (1, 2) | NDF Flag State | Regenerated NDF Bits (1, 2, 3, 4) |
| --- | --- | --- |
| 00 | Assume negated | 0110 |
| 01 | Negated | 0110 |
| 10 | Active | 1001 |
| 11 | Assume AIS | 1111 |

The example provided in Table 1 is based on the H1/V1 (higher) byte of a conventional two-byte SDH pointer. The H1/VI byte includes four NDF bits (bits 1 to 4), two 'ss' bits (bits 4 and 5) and two upper bits of the actual pointer value (bits 7 and 8). The remaining bits of the pointer value are held in the lower byte of the pointer (not shown). The NDF bits are normally used to indicate when the pointer value is a new value as opposed to being an incremented or decremented value. The four NDF bits together normally adopt one of three different values, namely, 0110, 1001 or 1111 (AIS). Four bits are used for robustness i.e. four bits are less likely to be irretrievably corrupted when transmitted across a network than, say, one bit, or two bits. Within a network node, however, the pointer bits are regenerated during the signal adaptation process and are therefore known to be error free. This means that not all four of the NDF bits are required for their nominal purpose within the network node. In particular, two of the NDF bits can be considered as redundant within the node. For example, if the apparatus 30 is arranged to use, say, bits 3 and 4 of the NDF bits as the signalling channel, leaving bits 1 and 2 unmodified, then the two NDF bits which are adjusted by the apparatus 30 for signalling within the node can readily be regenerated or reconstructed (for output from the node) using Table 1. In contrast, both of the "ss" bits are completely redundant within the node (and each can therefore be used as a signalling channel) since the original settings of the "ss" bits are known from the configuration of the apparatus 30.

In the preferred embodiment, a declaration of AIS on the path of the second data signal does not result in the adjusted NDF bit(s) being overwritten with '11' since the AIS condition can readily be communicated within the node using only the two unmodified NDF bits, as can be appreciated from Table 1.

Referring again to FIG. 3, the second data signal, together with the message encoded or embedded in the pointer bit(s), is transmitted to each of the first and second data ports 32, 34. Each of the first and second data ports 32, 34 includes a respective pointer monitor 64, 66 arranged to monitor the setting of the adjusted pointer bit(s), in the present example bits 3 and 4 of the H1/V1 byte, of the second data signal path in order to determine whether or not its respective path A, B was selected for the first data signal. In the preferred embodiment, the respective pointer monitors 64, 66 communicate the settings of the appropriate pointer bit(s) to the respective port controller 50, 52 which is programmed to determine path selection from the setting of the adjusted pointer bit(s). The port controller 50, 52 may then take whatever action deemed appropriate, for example it may ignore any subsequent performance information communicated to it by the respective signal adapter 38, 40, or it may cease to transmit or report said performance information on to, for example, the node controller (not shown), until such time as it detects that its respective path A, B becomes selected.

Before the second data signal is output via respective paths PATH_A_OUT, PATH_B_OUT, it is necessary to regenerate the adjusted pointer bit(s) to their respective pre-adjustment values. To this end, the first and second data ports 32, 34 have a respective regenerator module 68, 70 arranged to regenerate the adjusted bit(s) in accordance with, for example, Table 1.

It will be noted that the arrangement of the apparatus 30 as depicted in FIG. 3 is not limiting. For example, in some cases, the signal adapters 38, 40, 56, or equivalent modules, may be provided outside of the respective data ports 32, 34, 36. Similarly, the path selection module 42 may be provided outside of the third data port 36. The arrangement shown in FIG. 3 is used for illustrative purposes. Further, the adjustment of one or more pointer bits relating to said second data signal may be effected after a new pointer has been generated for the second data signal (as indicated in FIG. 3) for local equipment timing, or the pointer bit(s) adjustment may be effected during the generation of the new pointer (in which case, the pointer adjuster 60 may co-operate with the signal adapter 56 rather than operating directly on the path of the second data signal.

It will be apparent that message signalling between the third data port 36 and the first and second data ports 32, 34 is not limited to the indication of path selection. For example, in general, one data port may wish to signal to another data port that a data signal, which was sent from said one data port to said other data port, was safely received by it. This may be achieved by embedding a message in one or more pointer bits associated with a second data signal to be sent from said one data port to said other data port. Thus, the invention also provides generally a method and apparatus for signalling between data ports within a network node, using redundant pointer bits.

Further, the use of one or more NDF pointer bits as an intra-node signalling channel is not limited to indication of path selection, or to use in nodes where two (or more) independent data signals are transported between data ports in opposite senses. The NDF pointer bits are suitable for general use as one or more signalling channels within a network node. For example, if a data port expects to receive a data signal from a specific other data port., then said specific other data port may use one or more of said NDF pointer bits to embed a message in said data signal, which message serves as an identifier of said specific other data port. Thus, when said data port receives a data signal, it checks the adjusted NDF pointer bit(s) and compares the identifier message embedded therein with a known identifier for said specific other data port. If there is no match, then said data port may conclude that it has received the wrong data signal and may, for example, raise an alarm.

It will further be appreciated that although the present invention is described herein in the context of SDH protocol, it is not limited to use with that protocol but is suitable for application in synchronous transmission systems generally.

The invention is not limited to the embodiments described herein which may be modified or varied without departing from the scope of the invention.

What is claimed is:

1. A synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the apparatus comprising:

first and second data ports each arranged to receive a first data signal carried on a respective first and second transmission path;

a path selection module, co-operable with each of said first and second data ports and arranged to select one or other of said first and second transmission paths;

a third data port, co-operable with the path selection module to output data received on the selected one of said first and second transmission paths;

the third data port being arranged to receive a second data signal on a respective transmission path and to communicate said second data signal to each of said first and second data ports for output thereby; and a message encoding module, arranged to determine which of said first and second transmission paths is selected, and being co-operable with said second data signal transmission path to adjust at least one of the pointer bits associated therewith to indicate said path selection;

each of said first and second data ports being co-operable with the second data signal transmission path to determine the setting of said at least one pointer bit and thereby to determine which of the first and second data paths is selected.

2. An apparatus as claimed in claim 1, wherein said pointer bits include new data flag (NDF) bits, said message encoder module being arranged to adjust one or more of said new data flag (NDF) bits.

3. An apparatus as claimed in claim 1, wherein the apparatus is arranged to generate new pointer bits to adapt the second data signal to the local timing of the apparatus, the message encoder module being arranged to adjust at least one pointer bit of said generated new pointer bits.

4. An apparatus as claimed in claim 1, wherein the apparatus is arranged to generate new pointer bits to adapt the second data signal to the local timing of the apparatus, the adjustment of said at least one pointer bit being effected during the generation of said new pointer bits.

5. A data port for synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the data port being arranged to receive a first data signal from a selected one of a first and a second transmission path, and being further arranged to receive a second data signal on a respective transmission path, the data port including a message encoding module, arranged to determine which of said first and second transmission paths is selected, and being co-operable with said second data signal transmission path to adjust at least one of the pointer bits associated therewith to indicate said path selection.

6. In a synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the apparatus comprising first and second data ports each arranged to receive a first data signal carried on a respective first and second transmission path; a path selection module, co-operable with each of said first and second data ports and arranged to select one or other of said first and second transmission paths; a third data port, co-operable with the path selection module to output data received on the selected one of said first and second transmission paths, the third data port being arranged to receive a second data signal on a respective transmission path and to communicate said second data signal to each of said first and second data ports for output thereby, a message signalling method comprising determining which of said first and second transmission paths is selected;

adjusting, at said third data port, at least one of the pointer bits associated with said second data signal path to indicate said path selection;

determining, at each of said first and second data ports, the setting of said at least one pointer bit thereby to determine which of the first and second data paths is selected.

7. A method as claimed in claim 6, wherein said pointer bits include new data flag (NDF) bits, the method including adjusting at least one new data flag (NDF) bit to indicate said path selection.

8. A synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the apparatus including two data ports, one of said data ports being arranged to receive a first data signal on a respective data path, the other data port being arranged to receive a second data signal on a respective data path, said one data port being arranged to communicate said first data signal to said other data port, said other data port being arranged to communicate said second data signal to said one data port, wherein in order to communicate a message relating to said first data signal from said other data port to said one data port, said other data port is arranged to embed said message in one or more pointer bits associated with the path of said second data signal, said one data port being arranged to determine said message by examining said one or more pointer bits.

9. An apparatus as claimed in claim 8, wherein said pointer bits include new data flag (NDF) bits and said message is embedded in one or more of said new data flag (NDF) bits.

10. In a synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the apparatus including two data ports, one of said data ports being arranged to receive a first data signal on a respective data path, the other data port being arranged to receive a second data signal on a respective data path, said one data port being arranged to communicate said first data signal to said other data port, said other data port being arranged to communicate said second data signal to said one data port, a message signalling method comprising embedding, at said other data port, a message relating to said first data signal in one or more pointer bits associated with the path of said second data signal;

examining, at said one data port, said one or more pointer bits to determine said message.

11. A method as claimed in claim 10, wherein said pointer bits include new data flag (NDF) bits, the method including embedding said message in one or more of said new data flag (NDF) bits.

12. A synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the pointer bits including new data flag (NDF) bits, the apparatus comprising two or more data ports and being arranged to communicate data signals between data ports on respective transmission paths, wherein in order to signal a message between data ports, the apparatus is arranged to embed said message in one or more of said new data flag (NDF) bits associated with the transmission path of a data signal being communicated between said data ports.

13. In a synchronous transmission apparatus for use in a synchronous transmission network in which data signals are carried on transmission paths, the data signals being arranged in container units which are arranged in data frames, each container unit being associated with respective pointer bits which indicate the position of the container unit within a respective data frame, the pointer bits including new data flag (NDF) bits, the apparatus comprising two or more data ports and being arranged to communicate data signals between data ports on respective transmission paths, a message signalling method comprising embedding a message in one or more of said new data flag (NDF) bits associated with the transmission path of a data signal being communicated between said data ports.

* * * * *